(No Model.)
W. HULLERMAN.
TIRE SHRINKER.
No. 564,690. Patented July 28, 1896.
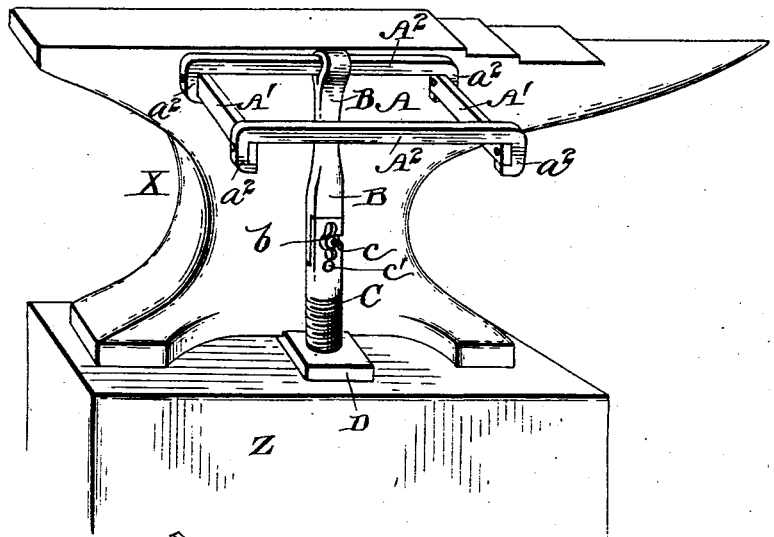
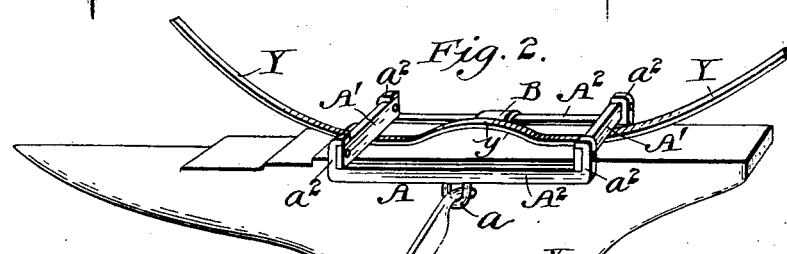
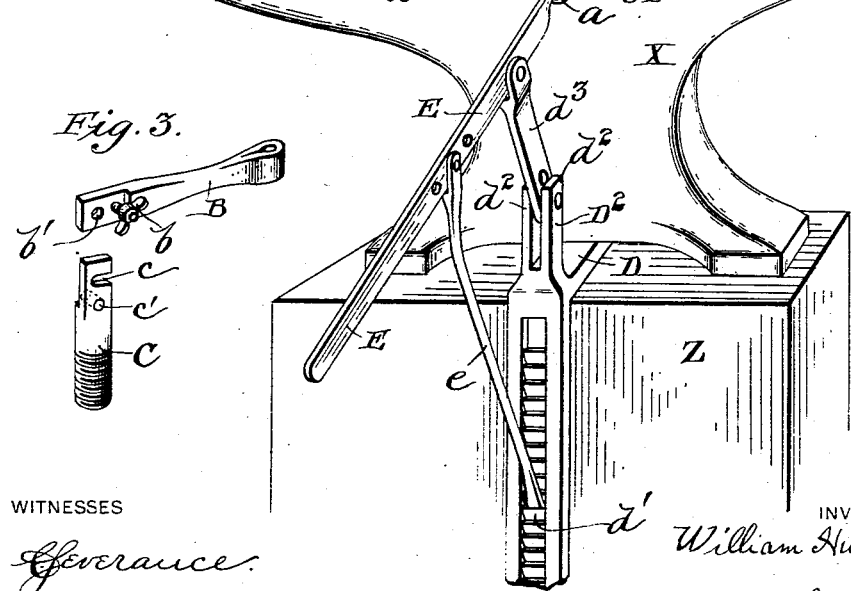
WITNESSES
INVENTOR
William Hullerman

UNITED STATES PATENT OFFICE.

WILLIAM HULLERMAN, OF INDEPENDENCE, IOWA.

TIRE-SHRINKER.

SPECIFICATION forming part of Letters Patent No. 564,690, dated July 28, 1896.

Application filed December 27, 1895. Serial No. 573,427. (No model.)

*To all whom it may concern:*

Be it known that I, WILLIAM HULLERMAN, a citizen of the United States, residing at Independence, in the county of Buchanan and State of Iowa, have invented certain new and useful Improvements in Tire-Shrinkers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in tire-shrinkers and is designed especially for use in connection with an ordinary anvil, being so constructed that it can be fitted thereto and removed therefrom with the least possible trouble or inconvenience.

The invention consists, essentially, of a holder and the mechanism for securing and holding the device locked over and upon the anvil and tire thereon when it is desired to shrink or make a tire smaller.

The invention further consists in the novel construction and arrangement of the several parts of the device hereinafter described, illustrated in the drawings, and more particularly pointed out in the claims hereunto appended.

In the drawings, Figure 1 is a view showing the manner of hinging the tire-holder to an anvil. Fig. 2 is a view of the opposite side of an anvil, showing a tire thereon, the holder thrown upon said tire and locked thereon by means of the locking mechanism. Fig. 3 are detail views of the hinge-post.

Referring to the drawings by letters, X represents an anvil of the usual construction, and Z the block or support upon which said anvil rests.

A indicates the tire-holder, and consists of the end pieces A' A', which are connected and held by the side pieces $A^2$ $A^2$, which side pieces pass to the outside of the said end pieces and have their ends $a^2$ $a^2$ turned around and over the said end pieces for the purpose of strength. The side and end pieces of the holder are riveted, as shown in the drawings, to each other, or they may be secured together in any suitable manner.

D is a bar or base-piece fitted under the anvil upon the block or support, and has in one end thereof a screw-threaded opening into which fits a screw-threaded post C. This post C has its upper end squared off and is provided near the upper end thereof, extending from one side, with a slot $c$, as shown, and below the slot with a pin or projection $c'$.

B is a strap or hinge, and is provided in its upper end with a recess or channel, into which sets and rests one of the side pieces $A^2$ $A^2$ of the holder A, and has one side of its lower end squared off to fit upon the squared-off end of the post C. The lower end of this strap is provided with an opening $b'$, into which sets the pin $c'$ on the post C, and just above this opening is a thumb-screw $b$, which fits in the slot $c$, and is for the purpose of holding the strap and the post rigid when tightened and the device is in use. By this construction of this hinged support, (being made separable,) as shown in the drawings, the upper portion can be removed and the post C turned to either raise or lower the holder to accommodate different thicknesses of tires, as is evident. Upon the side piece $A^2$ and directly opposite the hinged strap is a catch or staple $a$, for a purpose hereinafter set forth.

On the opposite end of the bar or base D is provided an upwardly-extending set of ratchet-teeth that depend from the end of said bar down the side of the block Z. On the same end of this bar or base is an upwardly-extending forked bracket $D^2$, between the prongs $d^2$ of which is pivoted a lever $d^3$, which said lever $d^3$ has pivoted at its upper end a lever or handle E, provided at one end with a hook or catch for the purpose of engagement with the catch or staple $a$ on the side piece $A^2$ of the holder A, as shown.

$e$ is a ratchet-lever pivoted to the lever E between the lever $d^3$ and the handle of the lever E, its lower or free end being adapted to engage the upwardly-extending ratchet-tooth $d'$, as shown in the drawings.

Y is a tire placed upon the anvil and under the holder, having a curved portion $y$ therein indicating the point at which the shrinking is to be done.

The operation of this device is apparent without further description thereof.

Having thus described my invention, what I claim is—

1. In a tire-shrinker the combination of an anvil, with a holder, a separable and adjustable hinge-post secured to said holder and means for locking said holder over the anvil upon a tire, as set forth.

2. In a tire-shrinker the combination of a holder, a hinged support made in two parts and secured together by a pin and thumbscrew and adjustably secured at its lower end in a suitable base and at its upper end to one of the side pieces of the said holder, with means for locking said holder over the tire, as set forth.

3. In a tire-shrinker the combination of a holder, a separable and adjustable hinge-post secured to said holder, with a set of ratchet-teeth, a lever pivoted thereto, a handle pivoted to said lever and having a hook or catch on one end, and a pawl adapted to engage with the said ratchet-teeth pivoted between the said lever and the end of the handle, as set forth.

4. In a tire-shrinker the combination of a holder, a hinged support made in two parts and secured together by a pin and thumbscrew and adjustably secured at its lower end in a suitable base and at its upper end to one of the side pieces of the said holder, with a set of ratchet-teeth, a lever pivoted thereto, a handle pivoted to said lever and having a hook or catch at one end, and a pawl adapted to engage with the said ratchet-teeth pivoted between the said lever and the end of the handle, as set forth.

5. In a tire-shrinker the combination of a holder, a hinged support secured to one side piece thereof and a catch or staple $a$ in the opposite side piece of said holder, with a depending ratchet, a lever pivoted to the upper end thereof, a handle pivoted to said lever and having a hook or catch at one end thereof, and a pivoted pawl secured to said handle between the said lever and the end thereof adapted to engage the said ratchet to lock the holder upon a tire, as set forth.

In testimony whereof I affix my signature in presence of two witnesses.

WILLIAM HULLERMAN.

Witnesses:
S. E. MINICK,
R. W. HEALES.